United States Patent Office  3,661,860
Patented May 9, 1972

3,661,860
HYDROPHILIC POLYURETHANE
Eckhard C. A. Schwarz, Neenah, Wis., assignor to Kimberly-Clark Corporation, Neenah, Wis.
No Drawing. Filed May 11, 1970, Ser. No. 36,465
Int. Cl. C08g 22/14
U.S. Cl. 260—77.5 AQ        2 Claims

ABSTRACT OF THE DISCLOSURE

Hydrophilic polyurethane suitable as elastic film or foam of high tensile strength is prepared by introducing a tertiary amine copolymer segment which imparts hydrophilic properties without reducing the tensile strength of the resulting product.

DESCRIPTION OF THE INVENTION

This invention relates generally to hydrophilic polyurethanes and more particularly to high tensile strength hydrophilic polyurethanes produced by a reaction utilizing polypropylene glycol.

Urethane polymers are generally prepared by reacting a diisocyanate with a dihydroxy compound. The selection of particular reactants can depend, in part at least, upon the properties desired for the end product. For example, where high tensile strength is important, polypropylene glycol is commonly selected as the dihydroxy compound to be reacted with a diisocyanate such as toluene diisocyanate. While possessing high tensile strength, polyurethanes produced in this manner are quite hydrophobic, having a wetting angle of water of about 50°. Therefore, in applications such as those where the polymer is to be printed or written upon, steps must be taken to render the polyurethane more hydrophilic.

One method of producing hydrophilic polyurethanes is to select different reactants. For example, substituting polyethylene glycol for polypropylene glycol results in a more hydrophilic product. However, such polyurethanes lack the high tensile strength which results from the use of polypropylene glycol as a reactant.

Consequently, when it is desired that the product, e.g. film or foam, should have high tensile strength and be hydrophilic as well, resort must be had to other means for increasing one or both of these characteristics. Examples of such other means may be found in U.S. Pats. 2,900,378; 3,149,000; 3,249,465; and 3,382,090. Commonly these other means require an additional processing step increasing significantly the expense related to making the product.

Accordingly, it is a primary aim of this invention to use polypropylene glycol as a reactant for a polyurethane that is hydrophilic when formed without having been subjected to extra treatment steps.

It is a further object of this invention to provide hydrophilic polyurethanes that can be produced without requiring additional catalyst.

Other objects and advantages of the invention will become apparent upon reading the following detailed description.

While the invention will be described in connection with preferred embodiments, it will be understood that I do not intend to limit the invention to these embodiments. On the contrary, I intend to cover all alternatives, modifications, and equivalents as may be included within the spirit and scope of the invention as defined by the appended claims.

In accordance with the invention a tertiary amine copolymer segment is introduced which provides hydrophilic properties in the final polyurethane structure. Furthermore, the tertiary amines act as catalysts for the reactions thus avoiding the necessity for additional catalyst.

The invention will be illustrated in detail by the following examples which serves to point out specific embodiments and are not intended to limit the invention as other applications will suggest themselves to one skilled in this art.

EXAMPLE I

Twenty grams of propylene oxide and 0.73 gram of butyl amine were condensed in an autoclave to a polymeric diol of about 2000 molecular weight according to the following reaction:

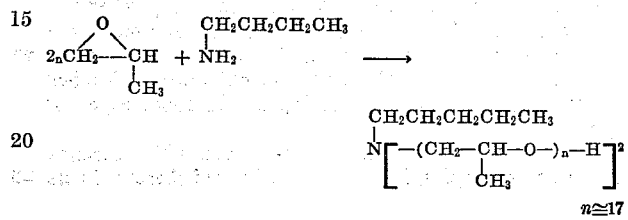

This reaction was allowed to proceed in the sealed autoclave at 100° C. for 24 hours. At the end of this period 20 grams of the diol were immediately mixed in a beaker with 1.92 grams of toluene diisocyanate and allowed to polymerize at room temperature. The tertiary amine group of the diol acted as a catalyst for the urethane formation. When the desired polymerization had taken place (after about 2 to 3 minutes), a film of the polymer was cast from tetrahydrofuran solution and dried for one hour. This film had a wetting angle of water of 25°.

EXAMPLE II

Twenty grams of propylene oxide and 0.86 gram of anhydrous piperazine were reacted to form a modified polypropylene glycol, as in Example I. The resulting diol had the following structure:

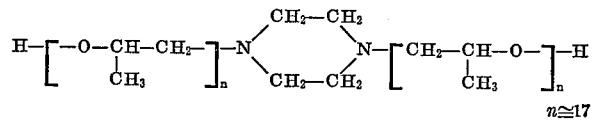

Twenty grams of this diol were reacted with 1.92 grams of toluene diisocyanate to form a thermoplastic, linear polyurethane. This polyurethane had a wetting angle of water of 18°.

EXAMPLE III

Twenty grams of propylene oxide and 0.88 gram of N-dimethyl-ethylene diamine were reacted as in the previous examples. The resulting diol or modified polypropylene glycol had the following structure:

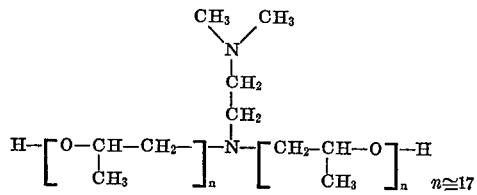

Twenty grams of this diol were reacted with 1.92 grams of toluene diisocyanate to form a polyurethane. A film of this material cast from tetrahydrofuran and dried at 80° C. for 1 hour had a wetting angle of water of 18°.

The particular tertiary amine used involves a matter of choice as long as it is capable of reacting to form copolymer segments in the polyurethane structures. It is prepared as a polymeric diol by condensing a mono- or oligo-amine having a total of two reactive hydrogens with propylene oxide. Suitable amines for this reaction include butyl amine, piperazine, cyclohexylamine, aniline, N,N'-diphenylhydrazine as well as others having the aforementioned two reactive hydrogens. An oligo-amine as used herein is defined as an amine having up to 10 nitrogen atoms. The amount of amine added is preferably in the range of 0.01 to 0.1 mole per mole of propylene oxide monomer units.

Various diisocyanates may be employed in accordance with the present invention with the preferred compounds being the arylene diisocyanates. Examples of this class include 2,4-toluene diisocyanate; 2,6-toluene diisocyanate; and M-phenylene diisocyanate.

As the above examples illustrate, applicability of this invention is not limited to any particular formulation but is useful for polyurethanes as a class. Elastic hydrophilic films formed from these polymers find utility wherever such films have heretofore been used, e.g. wrappings, osmotic membranes, etc. Open cell foam structures of these materials may be used alone or in combination with other materials in many ways including as absorbent wipes or sponges.

While the invention has been described with reference to specific examples, it is not to be limited thereto. In its broadest aspects the invention may be variously embodied within the scope of the appended claims.

What is claimed is:

1. Hydrophilic, thermoplastic, linear polyurethane prepared by reacting a polymeric diol containing tertiary amine copolymer segments with an arylene diisocyanate wherein said polymeric diol has been prepared by reacting propylene oxide with 0.01 to 0.1 mole per mole of propylene oxide of a diamine having a total of two reactive hydrogens.

2. The polyurethane of claim 1 wherein said diisocyanate is toluene diisocyanate.

References Cited

UNITED STATES PATENTS 3,042,631   7/1962   Strandskov _____ 260—2.5
3,255,253   7/1966   Kuryla _____ 260—77.5 XR DONALD E. CZAJA Primary Examiner M. J. WELSH, Assistant Examiner U.S. Cl. X.R.

260—2.5 AQ

PO-1050
(5/69)

UNITED STATES PATENT OFFICE
CERTIFICATE OF CORRECTION

Patent No. 3,661,860            Dated May 9, 1972

Inventor(s) Eckhard C. A. Schwarz

It is certified that error appears in the above-identified patent and that said Letters Patent are hereby corrected as shown below:

In Column 2, line 19, "$CH_2CH_2CH_2CH_2CH_3$" should read -- $CH_2CH_2CH_2CH_3$ --.

Signed and sealed this 3rd day of October 1972.

(SEAL)
Attest:

EDWARD M. FLETCHER, JR.            ROBERT GOTTSCHALK
Attesting Officer                  Commissioner of Patents